Figure 1:
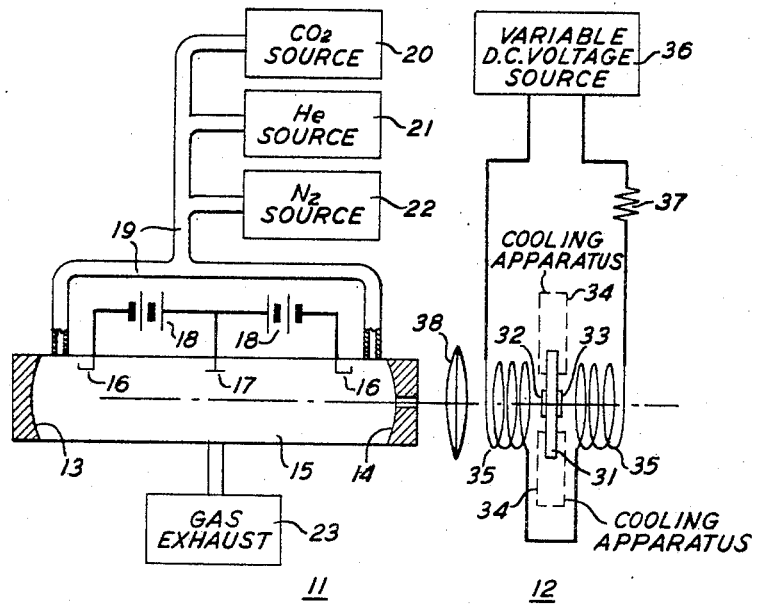

March 25, 1969     P. A. WOLFF     3,435,373

TUNABLE RAMAN LASER

Filed Jan. 21, 1966

INVENTOR
*P. A. WOLFF*
BY
*Wilford L. Wisner*
ATTORNEY

United States Patent Office 3,435,373
Patented Mar. 25, 1969

3,435,373
TUNABLE RAMAN LASER
Peter A. Wolff, Berkeley Heights, N.J., assignor to Bell Telephone Laboratories, Incorporated, New York, N.Y., a corporation of New York
Filed Jan. 21, 1966, Ser. No. 522,174
Int. Cl. H01s 3/10; H03f 7/00
U.S. Cl. 331—94.5       5 Claims In the laser art, a highly desirable sort of laser is one that is continuously tunable over a broad band of frequencies. This invention is directed to a laser tunable over a particularly broad band of frequencies. Moreover, among tunable lasers the most desirable are those in which the tuning requires no mechanical adjustment. This invention is directed to a laser tuned by variation of a magnetic field.

Investigation of the properties of crystals and of the properties of solid state plasmas increasingly creates a need for a source of continuously tunable coherent radiation. In the future, optical communicaton systems also may need broadly tunable local oscillator sources, particularly for optical superheterodyne systems analogous to present-day radio systems.

Field-tunable lasers have previously been proposed. These include the cyclotron resonance laser disclosed in my copending application, Ser. No. 442,918, filed Mar. 26, 1965 now Patent No. 3,265,977 and assigned to the assignee hereof. A further example is the injection laser disclosed by R. J. Phelan and R. H. Rediker in their article "Magnetic Tuning of CW InSb Diode Laser," IEEE Proceedings, 52: 91 January, 1964. The first of the foregoing lasers is not readily employable to produce infrared radiation of wavelength shorter than about 50 microns, whereas the latter laser is tunable only over a limited portion of the infrared wavelengths.

According to my present invention, I have recognized that magnetically tunable coherent radiations in the infrared and far infrared can be obtained in a low-effective-mass semiconductor material, such as indium antimonide, by adapting the magnetic field and coherent pumping radiation to produce an electronic Raman transition involving Raman scattering from mobile (conduction band) charge carriers. The high-power carbon dioxide laser is an usually well-suited pump source.

The Raman transition is one in which the mobile charge carrier increases its Landau (cyclotron) level quantum number by two; and the outgoing radiation frequency is the pump frequency less twice the cyclotron frequency. The cyclyotron frequency becomes nonzero only in the presence of a magnetic field. Thus, no Raman scattering occurs in the absence of a magnetic field, and the output radiation is then the pump radiation. At the other limit of tuning, a sufficiently large magnetic field, 150,000 gauss in indium antimonide, would enable twice the cyclotron frequency to be equal to the pump frequency, for the case of a carbon-diodixe laser as the pump, so that the output would have zero frequency. Nevertheless, because of the difficulty of satisfying the conditions for oscillation at the longer wavelengths in a crystal of reasonable size, the practical longer wavelength limit of tuning is in the far infrared, perhaps approaching the millimeter wave range.

Between the pump wavelength and the millimeter wavelength range, the frequency of the output radiation is a continuous function of magnetic field strength, although the radiation at certain frequencies may be absorbed. Thus, the present invention is particularly useful as an essentially continuously tunable source of coherent infrared and far infrared energy.

The most immediate application of such a source may well be for the investigation of the properties of crystals or of the properties of the atmosphere. In addition, numerous applications in communication systems are feasible. For example, with a laser according to the present invention employed as a tunable local oscillator source, fixed-intermediate-frequency optical heterodyne systems can be used for communication.

A low-effective-mass material, such as indium antimonide, lead selenide, lead telluride, mercury telluride, certain alloys of mercury telluride, bismuth and bismuth-antimony alloys, is advantageously employed in practicing the invention. An appreciable cross-section for Raman scattering according to the present invention requires that the zero-momentum cyclotron energy level spacing, $h\nu_c$, should be an appreciable fraction of the bandgap energy, $Eg$, of the material. The materials mentioned above have small gaps. Their low effective-masses enable $h\nu_c$ to be an appreciable fraction of the bandgap energy with magnetic fields of reasonable strength. Both of these characteristics, small gap and low effective-mass, are advantageous for materials for use in lasers according to my invention.

More specific features of a preferred embodiment of the invention reside in the application of the magnetic field and infrared pumping radiation collinearly along the axis of a resonator in which the crystal is disposed. The pumping radiation is provided at a power level sufficient to exceed the threshold for stimulated emission of the Raman radiation and is at a frequency lower than the bandgap frequency.

To these ends, the high-power carbon dioxide laser disclosed in the copending application of C. K. N. Patel, Ser. No. 495,844, filed Oct. 14, 1965, and assigned to the assignee hereof, is particularly well-adapted as a pumping source for most of the low-effective-mass materials listed above. The continuous-wave power output of coherent radiation from the $CO_2$ laser can exceed the threshold for stimulated Raman emission; but it may be desirable to operate on a pulsed basis to provide an output of higher peak power while simplifying the problem of cooling the crystal.

Figure 2:
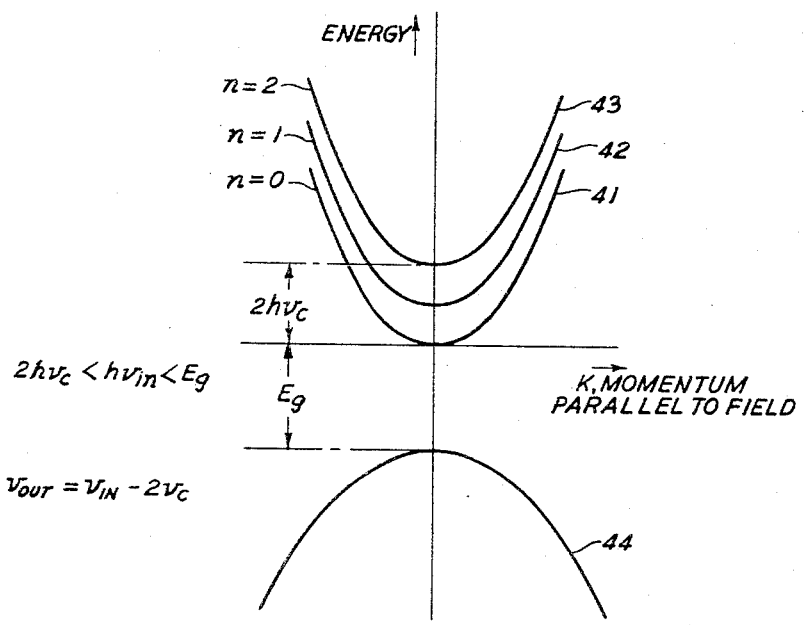

A more complete understanding of the invention, in all its aspects, may be obtained from the following detailed description, taken together with the drawing, in which:

FIG. 1 is a partially pictorial and partially block diagrammatic showing of a preferred embodiment of the invention; and FIG. 2 shows an energy level diagram that will be helpful in understanding the theory and operation of the invention.

In the preferred embodiment of FIG. 1, the high-power carbon-dioxide laser 11 supplies coherent pumping radiation to the tunable Raman laser 12.

The high-power pumping laser 11 is of the type described in the above-cited copending patent application of C. K. N. Patel and typically includes reflectors 13 and 14 forming a suitable resonator; the transparent tube 15 forming the side walls of the laser; suitable electrical pumping apparatus including the cathodes 16, anode 17 and direct-current sources 18 connected in appropriate polarity between the anode and the cathodes; the inlet apparatus 19; the carbon dioxide, helium and nitrogen sources 20, 21 and 22, respectively, connected to inlet apparatus 19; and the equipment 23 for exhausting the spent gases from the laser or for cooling and separating them for reuse.

The reflector 14 has a transmissive central portion through which the output coherent radiation is directed toward Raman laser 12. From the laser 11, as described, this radiation typically has a wavelength of 10.6 microns. In any event, the pumping laser 11 should provide radiation having a photon energy less than the bandgap energy of crystal 31 in laser 12. The lens 38 focuses the beam in crystal 31 to a spot size of about $0.8 \times 10^{-4}$ square centimeters (spot about 100µ in diameter).

The Raman laser 12 comprises a rectangular crystal 31 of indium antimonide (InSb) having two broad major faces intercepting the pumping radiation and being mutually opposed along the direction of propagation of pumping radiation so that the reflectors 32 and 33 disposed thereon form a suitable optical resonator for the forward-scattered Raman radiation. The Raman laser 12 further includes the Helmholtz coil 35 adapted to provide a uniform magnetic field within the central portion of crystal 31, the variable direct-current voltage source 36 connected through the current-limiting resistance 37 to the terminals of the coil 35, and the cooling apparatus 34, which encompasses the portion of crystal 31 that extends beyond the limits of the coil 35. The cooling apparatus may thus assume a toroidal appearance. The extended portion of crystal 31 acts as a cooling fin to dissipate the heat accumulated in the portion of the crystal through which the pumping beam passes.

The strength of the magnetic field of coil 35 should be such that the spacing of the cyclotron energy levels of conduction band electrons in crystal 31 is less than half of the bandgap energy of crystal 31. Moreover, the applied magnetic field is preferably directed along the resonator axis, although it could be directed at any other angle with respect thereto, provided a substantial component of the electric field of the pumping radiation is orthogonal to the applied magnetic field direction.

The crystal 31 is a crystal of the low-effective-mass semiconductor indium antimonide grown to include a doping impurity such as selenium or tellurium in sufficient quantity to render the crystal n-type with about $3 \times 10^{15}$ conduction band electronic charge carriers per cubic centimeter. More broadly, the charge carrier concentration preferably lies in the range from $1 \times 10^{14}$ to $1 \times 10^{17}$ per cubic centimeter. Although selenium or tellurium are preferred dopants, sulfur or other donor impurities might be employed. It is particularly noted that only conduction band charge carriers play any roles in a laser according to the present invention and that it is not necessary or desirable to raise any charge carriers from the valence band. The introduction of acceptor impurities is to be avoided for this reason.

Illustratively, crystal 31 is about one millimeter thick between reflectors 32 and 33 in the direction of propagation and about one square centimeter in cross section. Instead of indium antimonide, crystal 31 could also be lead selenide, lead telluride, mercury telluride or certain alloys of mercury telluride doped to have about the same free charge carrier concentration. The alloys of mercury telluride employable with the $CO_2$ laser 12 are those having bandgap energies greater than 0.12 electron volt.

In the preferred embodiment of FIG. 1, the reflectors 32 and 33 are illustratively thinly vacuum-deposited metal. Alternatively, they could be highly polished surfaces of the crystal; or they could be spaced from the major surfaces of crystal, if higher resonator Q's are desired. Whether deposited on crystal 31 or separate, reflectors 32 and 33 could also be curved to provide focusing, i.e., of the near confocal sort. If focusing reflectors are to be employed, the major surfaces of crystal 31 are ground to have the appropriate contour to conform to wavefronts of constant phase. In most cases, higher Q's are possible at lower doping levels.

Cooling apparatus 34 illustratively comprises tubing coiled to lie adjacent to the outer portions of the major surfaces of crystal 31 and means for flowing a refrigerant, such as liquid nitrogen at 77° K., through the coils. Alternatively, other techniques such as evaporative cooling or continuous water flow over the outer portions of the crystal may be employed to remove the heat generated within crystal 31.

The Helmholtz coil 35 comprises two series-connected on parallel-connected sections spaced apart upon opposite sides of crystal 31. The separation of the two sections is equal to the coil radius. This arrangement is advantageous since it provides an axial field as uniform as that provided by an induction coil and still enables the lateral extension of crystal 31 beyond the coil 35. Alternatively, an induction coil with a diameter sufficiently large so that the coil surrounds crystal 31 could also be employed.

The variable D.C. voltage source 36 and the current limiting resistor 37 are of the type conventional in the art.

In operation, the coherent 10.6 micron radiation from $CO_2$ laser 12 is incident upon crystal 31 with a power level that is illustratively 100 watts on a steady continuous-wave basis. The tranmissivity of reflector 32 permits a portion of this radiation to pass into the body of crystal 31 in a beam of $0.8 \times 10^{-4}$ square centimeters in area. Multiple reflections within crystal 31 build up the pumping power density therein. The pumping power density within the active region of crystal 31 is in excess of the threshold for stimulated Raman radiation.

In the crystal 31, the 10.6 micron radiation encounters conduction band electrons that have components of motion perpendicular to the field. These components are quantized and separated in energy approximately by $$h\nu_c = heB/m^*c \qquad (1)$$

where $h$ is Planck's constant in appropriate units, $\nu_c$ is cyclotron frequency, $c$ is the velocity of light, $m^*$ is the effective mass of an electron in the conduction band of crystal 31, $e$ is its charge and B is the magnetic field strength. The effective mass, $m^*$, for an electron in indium antimonide is approximately 0.013 of the mass of a completely free electron.

The conduction band electrons typically have various momenta parallel to the direction of the field. Curves of their total energy versus momentum parallel to the field are shown by curves 41, 42 and 43, for example, in FIG. 2. Each of these curves represents a group of electrons having an energy of motion perpendicular to the direction of the field which is approximately that shown at the vertex of each curve. The energy spacing of these curves is approximately the cyclotron energy, $h\nu_c$. For example, in InSb a field of 30 kilogauss gives a cyclotron energy $h\nu_c \approx 0.02$ ev., which is less than half the bandgap energy $Eg = 0.27$ ev., as is desired.

The incident 10.6 micron radiation, to the extent scattered by mobile electrons, will produce a photon at a new frequency for each photon scattered. The electric dipole selection rules insure that in a two-photon process the Landau level quantum number of the electron changes by $\Delta n = 0$ (elastic scattering) or $\Delta n = +2$ (Stokes scattering). The Stokes radiation is the Raman radiation of interest for the present invention.

The frequency $\nu_{out}$, of the output radiation is less than the frequency, $\nu_{in}$, of the input radiation according to the relation:

$$\nu_{out} = \nu_{in} - 2\nu_c \qquad (2)$$

where $\nu_c$ is the cyclotron frequency of the conduction band electrons.

The cross-sections for the production of such radiations would be zero for free, nonrelativistic electrons or for conduction band electrons in a material for which the curves 41, 42, 43, etc., are perfect parabolas, equally spaced. Equal spacing of the energy-momentum curves reflects the fact that a nonrelativistic electron in a magnetic field usually behaves as a harmonic oscillator. One does not expect frequency mixing when light interacts with a perfectly harmonic system. However, if the electron's properties are slightly anharmonic, as will occur if the energy-momentum curves are noparabolic, then the cross-section for Raman scattering from mobile electrons in the conduction band becomes appreciable. The energy-momentum curves of the conduction band electrons in crystal 31 are substantially nonparabolic in the apparatus of the present invention.

For the applied field of 30 kilogauss, the Stokes radiation occurs at a wavelength of about 15 microns, scattered in the forward direction collinearly with the 10.6 micron pumping radiation. If desired, the accompanying 10.6 micron radiation can be eliminated at the output by a 0.040 inch thick sapphire filter without appreciably attenuating the 15 micron radiation.

Moreover, at the stated pumping power lever, the output Raman radiation is coherent. The threshold for all possible frequencies of the Raman radiation from far infrared frequencies to the pump frequency is within the power output capabilities of the $CO_2$ laser 11, except that the Raman radiation at 31.8 microns is so strongly absorbed by other conduction band electrons that the output at that wavelength is negligible when the pumping wavelength is 10.6 microns. In general, there is a tuning gap in the output at a wavelength three times the pumping wavelength. In addition, each type of crystal 31 has lattice vibrations that reduce the coherent radiation output at certain frequencies, for example, a band of frequencies at 52 microns in indium antimonide.

In various ones of the disclosed materials other than InSb the pumping power threshold for coherent Raman radiation may be substantially higher than for InSb. In such a case, it is desirable to focus the pumping beam into a smaller region of the crystal. At the same time, the best pumping frequency is in general different from the best pumping frequency for InSb. Crystals with characteristics intermediate those of the materials listed above may be obtained by growing mixed crystals of those materials.

It is understood that any other laser capable of exceeding the threshold for coherent radiation in crystal 31 could be substituted for laser 11 as the pumping laser, provided the energy of its emitted radiation photons is less than the bandgap energy of the crystal 31. Especially for the mercury telluride alloys having bandgap energies equal to or less than 0.12 electron volt (the energy of photons supplied by the $CO_2$ laser) and for bismuth and alloys of bismuth and antimony employed as crystal 31, a high power laser operating at a wavelength appreciably longer than 10.6$\mu$ is desirable. A high power laser suitable as a pump for all of these materials would advantageously operate at about 30$\mu$.

Various other modifications within the spirit and scope of the invention can be made by one skilled in the art. For example, if one is content to obtain a Raman radiation output less than half as intense as that of the embodiment of FIG. 1, the magnetic field can be directed orthogonal to the laser axis, provided the pumping radiation has a substantial electric field component orthogonal to the magnetic field direction. The intensity of the output radiation in such a modified embodiment would be just half of that of FIG. 1 if the pumping radiation is polarized with its total electric field vector orthogonal to the magnetic field direction. For magnetic field directions oblique to the laser axis, intermediate intensities of the output radiation can be obtained if the electric field vector of the pumping radiation is maintained orthogonal to the magnetic field direction.

What is claimed is:
1. A laser comprising a crystal of semiconductive material in which an electron has an effective mass less than the mass of a free electron, means forming an optical resonator disposed about said crystal, means for applying a magnetic field to said crystal, and means for applying to said crystal coherent pumping radiation in a direction substantially collinear with the axis of said resonator, said coherent radiation having a photon energy less than the bandgap energy of said crystal and having a power level sufficient for the stimulation of an output Raman radiation of a frequency

$$\nu_0 = \nu_p - 2\nu_c$$

where $\nu_p$ is the pumping frequency and $\nu_c$ is the cyclotron frequency of an electron in said magnetic field, said coherent pumping radiation having a substantial electric field component orthogonal to the magnetic field direction.

2. A laser according to claim 1 in which the crystal is an n-type crystal of material selected from the group consisting of indium antimonide, lead selenide, lead telluride, mercury telluride, alloys of mercury telluride and mixtures thereof.

3. A laser according to claim 2 in which the magnetic field applying means applies a field yielding a cyclotron electron energy that is a sufficiently large fraction of the bandgap energy of the material to render the cyclotron energy level spacing nonuniform.

4. A laser according to claim 1 in which the magnetic field applying means applies the magnetic field substantially collinearly with the axis of the resonator.

5. A laser comprising a crystal of semiconductive material in which an electron has an effective mass less than the mass of a free electron, means forming an optical resonator with an axis through said crystal, means for applying a magnetic field to said crystal, and means for applying to said crystal polarized coherent pumping radiation of photon energy less than the band gap of said crystal to scatter magnetic-field-dependent Raman radiation along the axis of said resonator.

References Cited

UNITED STATES PATENTS

| | | | |
|---|---|---|---|
| 3,265,977 | 8/1966 | Wolff | 331—94.5 |
| 3,300,653 | 1/1967 | Boyd | 331—94.5 |

JEWELL H. PEDERSEN, *Primary Examiner.*

WILLIAM L. SIKES, *Assistant Examiner.*

U.S. Cl. X. R.

307—88.3; 330—4.5